(12) United States Patent
Meunier

(10) Patent No.: US 6,637,666 B2
(45) Date of Patent: Oct. 28, 2003

(54) CODING SCHEME FOR ENCODED SHEET MATERIAL

(75) Inventor: Jean-Luc Meunier, Saint Nazaire les Eymes (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/079,001

(22) Filed: Feb. 19, 2002

(65) Prior Publication Data

US 2003/0155426 A1 Aug. 21, 2003

(51) Int. Cl.[7] .............................................. G06K 19/06
(52) U.S. Cl. ........................ 235/494; 27/1.1; 270/52; 428/192; 283/94
(58) Field of Search .............................. 235/494, 454, 235/487, 437; 270/1, 52, 53, 58; 283/36, 45, 94; 428/29, 192, 195

(56) References Cited

U.S. PATENT DOCUMENTS

| 5,085,417 | A |   | 2/1992  | Copham ...................... 270/1.1 |
| 5,184,003 | A | * | 2/1993  | McMillin et al. ............ 428/192 |
| 5,717,976 | A | * | 2/1998  | Chowdry et al. .............. 399/45 |
| 5,790,715 | A | * | 8/1998  | Iizuka ........................ 382/309 |
| 6,254,002 | B1 | * | 7/2001  | Litman ........................ 235/450 |
| 6,330,976 | B1 |   | 12/2001 | Dymetman et al. ......... 235/487 |
| 6,331,369 | B1 | * | 12/2001 | Kawakubo et al. ........... 430/22 |
| 6,335,084 | B1 |   | 1/2002  | Biegelsen et al. ........... 428/192 |

FOREIGN PATENT DOCUMENTS

| EP | 1 017 017 A2 | 7/2000 |
| JP | 02076796 | 3/1990 |
| JP | 09134415 | 5/1997 |
| WO | WO 00/16982 | 9/1999 |
| WO | WO 00/16983 | 9/1999 |

OTHER PUBLICATIONS

U.S. patent application Ser. No. 09/276,532, Copperman et al., filed Mar. 25, 1999.
U.S. patent application Ser. No. 09/643,628, Meunier et al., filed Aug. 21, 2000.

* cited by examiner

Primary Examiner—Karl D. Frech
Assistant Examiner—Edwyn Labaze
(74) Attorney, Agent, or Firm—Jeannette M. Walder

(57) ABSTRACT

An edge coding scheme for an encoded sheet material includes an offset mark located at an offset distance from a reference mark on the edge of the sheet material and a plurality of equally spaced clock marks disposed along the edge, such that the offset distance can be approximated by the product of the number of clock marks between the reference mark and the offset mark times the distance between successive clock marks. Another embodiment of the edge coding scheme includes coincidence between a first plurality of equally spaced apart clock marks and a second plurality of equally spaced Vernier marks, wherein the second plurality is less than the first plurality.

23 Claims, 6 Drawing Sheets

CODING SCHEME FOR ENCODED SHEET MATERIAL

CROSS-REFERENCE TO RELATED APPLICATIONS

This application is related to co-assigned, pending U.S. patent application Ser. Nos. 09/643,628 filed Aug. 21, 2000, Encoded Sheet Material and System for Processing; 09/643,629 filed Aug. 21, 2000, Method for Indexing and Retrieval of Physical Documents; and 09/643,136 filed Aug. 21, 2000, Authenticated Sheet Material, which are incorporated herein by reference.

FIELD OF THE INVENTION

This invention relates generally to encoded sheet material, and more particularly to edge coding schemes for sheet material having information recorded thereon.

BACKGROUND OF THE INVENTION

Despite the publicity about the paperless office, paper remains an important media in today's working environment. Many efforts have been made to integrate paper documents with computer-based information systems. These efforts generally involve two scenarios. The first scenario involves scanning an existing physical document to create a digital copy, assigning a digital file name and then managing the digital copy as any other digital file. The second scenario involves creation of a physical document from an existing digital document or file such as by printing. To aid in the integration process, a barcode or a Dataglyph may be printed or otherwise attached to, a physical document. Dataglyphs are generally less visually disruptive than barcodes. Both barcodes and Dataglyphs provide a means for the computer to grasp intentionally printed information on the paper document. Since both are generally applied at the time the information is recorded on the sheet of paper (but may be applied later through the use of an adhesive label), both generally appear on the same face of the sheet of paper as the recorded information.

SUMMARY OF THE INVENTION

U.S. patent application Ser. No. 09/643,628 filed Aug. 21, 2000, Encoded Sheet Material and System for Processing (the "628 application"), which is assigned to the assignee of this application, describes a way to uniquely identify sheets of material, such as paper, using a code which may be applied on the edge of material reams, or stacks, at production time. The 628 application also describes a code reader and a network infrastructure for associating the information recorded on the sheet of material with the edge code.

An encoded sheet material, according to the 628 application, includes a sheet of material having a first surface, a second surface disposed opposite the first surface and an edge extending between the first surface and the second surface and peripherally about the sheet of material, the edge having indicia arranged thereon to form a code uniquely identifying the sheet of material. A system for managing an encoded sheet of material includes a code reader operative in conjunction with an encoded sheet of material for reading an edge code; wherein the encoded sheet of material has a first surface, a second surface disposed opposite the first surface and an edge extending between the first surface and the second surface and peripherally about the sheet of material, the edge having indicia arranged thereon to form a code uniquely identifying the sheet of material; a sheet processing apparatus for reading information from and/or writing information to at least one of the first and second surfaces of the encoded sheet material; and a processor in communication with the code reader and the sheet processing apparatus for associating the information with the edge code.

By providing each sheet of material with a unique edge identifier, any information that may be recorded on the sheet of material may be associated with that sheet of material. By placing the unique identifier on the edge, both surfaces are available for recording information. The edge marking can be made with a visible or an invisible ink. If the recording device includes an edge reader coupled to a processor with a memory, whenever a user makes a copy of an electronic file, the recording device reads the edge marking on each sheet of material used, and the processor associates that sheet of material with the electronic file. This association can be stored in memory. This feature is useful for tracking or monitoring physical copies of an electronic file. Additional information or meta data may also be associated with the electronic file.

The association information may be stored and used for other purposes, such as monitoring the number of copies made of a particular file, for monitoring the location of the copies and for monitoring the number of sheets of material used. The association information can be made or updated at any time. For example, if an electronic file is printed on a sheet of material with a unique edge marking, that association may be made and stored in a memory at the time of printing or later. If that recorded sheet of material is used to make a photocopy, an edge reader in the copier can make an association of the read edge marking of the "original hard copy" with the edge marking of the sheet of material used to make the photocopy. This information may be stored in memory and can be used to update the association information with the original electronic file and create a new association for the "original hard copy."

Retrieving information associated with a sheet is accomplished by reading its edge identifier and querying the infrastructure to retrieve this information, given the identifier. Sheets of material may be pre-marked at production time. If pre-marked at production time, each sheet can be given a code identifying the ream to which it belongs as well as uniquely identifying that sheet. The code can include a portion identifying the ream, manufacturer, and other information that a user might require. Some reams of sheet material may be specially coded with special visible and/or invisible inks and used as special bond paper for financial instruments, for example. Indeed, some organizations may wish to reserve special reams of material.

Edge-readers can either be embedded in the recording devices (such as printers, facsimile machines, photocopiers, shredders, etc.) or affixed in work places (e.g. desktops). The edge readers may be coupled to a computer or network where the read association information may be read and/or written. The edge readers enable the automatic association of printed-sheet <-> document. Users may also use any sheet of a document either to obtain related service by passing the sheet through an edge-reader, or to establish an association in a similar way.

The 628 application discloses an edge code scheme based on use of an offset mark. The distance of the offset mark from a reference mark on the edge (such as a corner of the edge or a baseline mark on the edge) is used as the code for the particular sheet material. Another code scheme disclosed in the 628 application is one where the identifier of any sheet is given by the combination of the unique identifier of the ream with the offset, which is unique within a ream. Because of the size of the marks on the individual sheets of material, many of the ubiquitous, inexpensive optical readers currently in the marketplace cannot effectively read these edge coding schemes (i.e., accurately measure the offset distance). It would be desirable to have a coding scheme that provides enough information redundancy and error handling that could be read with enough accuracy by currently available inexpensive optical readers.

An encoded sheet material, according to an embodiment of the invention, includes a sheet of material having a first surface, a second surface disposed opposite the first surface and an edge extending between the first surface and the second surface and peripherally about the sheet of material, the edge having indicia arranged thereon to form a code uniquely identifying the sheet of material; wherein the code comprises an offset mark located at an offset distance from a reference mark on the edge and a plurality of equally spaced clock marks disposed along the edge, such that the offset distance can be approximated by the product of the number of clock marks between the reference mark and the offset mark times the distance between successive clock marks. The reference mark can be a corner of the edge, or a specific mark on the edge (such as a thicker bar code type mark near a corner of the edge). A reference mark may be easier to detect than a corner of the edge. If the edge mark includes a ream identifer, the ream identifer can act as the reference mark. Alternatively, two reference marks can be provided, such that the offset mark will always be located between the reference marks.

This edge code can be easily and accurately read using inexpensive optical readers. A method of decoding an encoded sheet material includes scanning the edge code, detecting any offset marks on the edge, detecting any clock marks on the edge, counting the clock marks between a reference mark on the edge and the offset mark, measuring the distance between the offset mark and an adjacent clock mark, and computing the sum of the distance between the offset mark and the adjacent clock mark and the product of the number of clock marks between the reference mark and the offset mark times the distance between clock marks on left and right of the offset.

The offset distance can be determined approximately by the product of the number of clock marks between the reference mark and the offset mark times the distance between successive clock marks. To identify uniquely each sheet in the ream, the distance between the closest clock mark and the offset mark must be measured. The distance between the offset mark and the adjacent clock marks is a short distance. The shorter the distance to measure is, the smaller the error and the more reliable the sheet identifier reading.

An encoded sheet material, according to another embodiment of the invention, includes a sheet of material having a first surface, a second surface disposed opposite the first surface and an edge extending between the first surface and the second surface and peripherally about the sheet of material, the edge having indicia arranged thereon to form a code uniquely identifying the sheet of material; wherein the code comprises coincidence between a first plurality of equally spaced apart clock marks disposed along the edge and a second plurality of equally spaced Vernier marks, wherein the second plurality is less than the first plurality.

This edge code can also be easily and accurately read using inexpensive optical readers. A method of decoding an encoded sheet material, includes scanning the edge code; detecting any clock marks on the edge; detecting any Vernier marks on the edge; detecting coincidence between the detected clock marks and the detected, Vernier marks; determining an offset distance using the! coincidence between the detected clock marks and the detected Vernier marks.

DETAILED DESCRIPTION OF THE PREFERRED EMBODIMENTS

Figure 1:
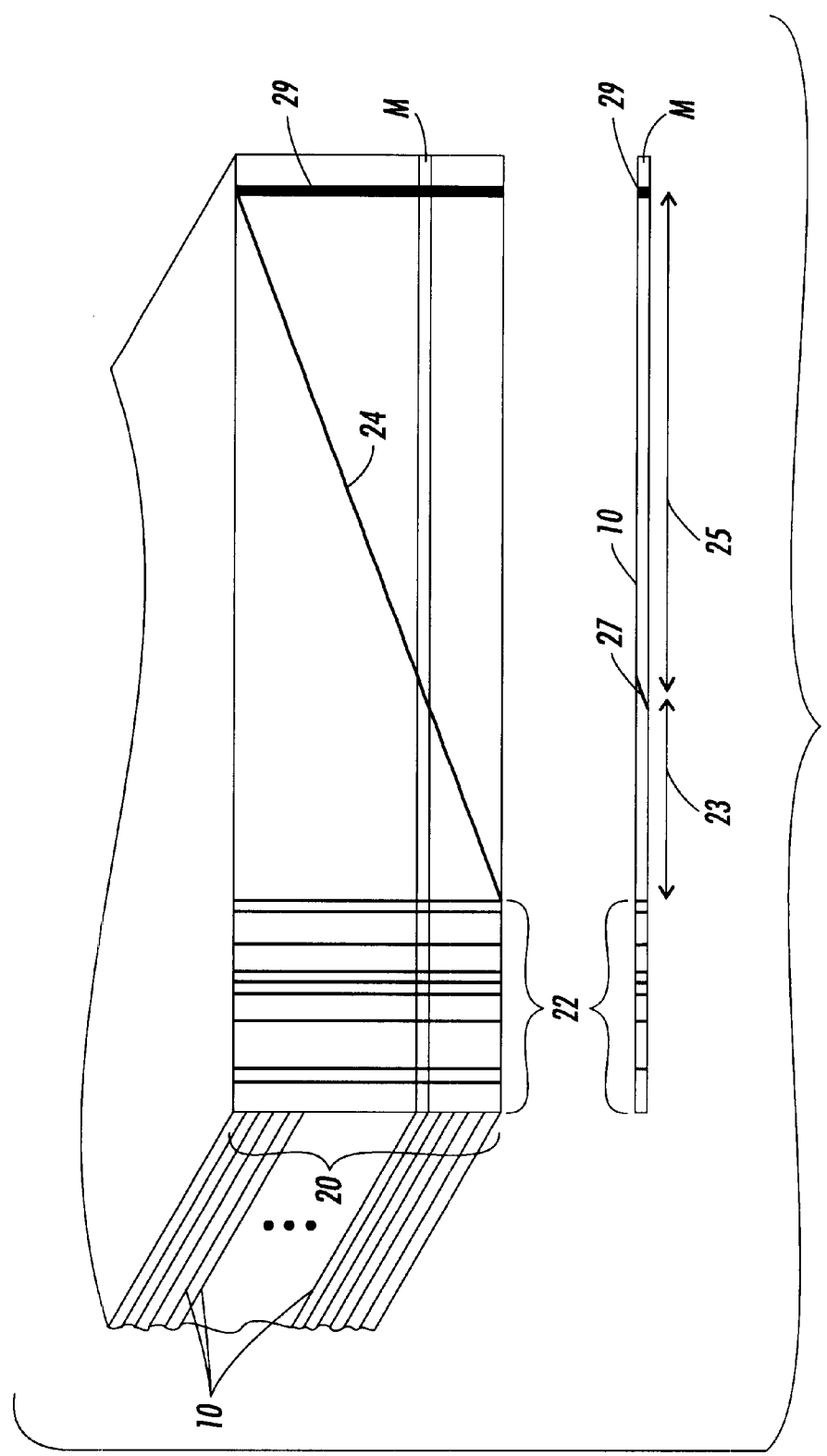
FIG. 1 is a diagram of a scheme for an edge marking including a ream marking and individual sheet marking.

Most sheets of material, such as paper sheets have six faces, two of them being commonly used for recording information: the so-called recto (first surface) and verso (second surface). The four other faces, the edges, may be used to uniquely identify each sheet and, optionally, the ream it comes from, manufacturer and so on. If a ream identifier is used as part of the unique sheet code, each sheet in the ream will receive the same unique ream identifier, in addition to a unique sheet identifier. These identifiers can be marked with visible or invisible ink of black ink or colored ink.

Typical A4 paper sold today presents on the long and short edges a combined edge surface of 297×0.1 $mm^2$ and 210× 0.1 $mm^2$, respectively. A robust code can be easily devised to fit within this size constraint. (A robust code is one that can be easily read on the edge of a single sheet of material and also affords a sufficiently large number of codes for the anticipated amount of sheets of material to be used.) For example, a 64 bit long code made of 1 mm wide bars on a 2 mm grid would require 128 mm, which leaves enough room (say 64 mm for 32 bits of error code) for error correction code. In total this code (with error correction) would require 192 mm, and would also fit on letter size sheets (8½ inches by 11 inches). A typical edge thickness of 0.1 mm is sufficient height to write the bar constituting the code. For instance, to give an order of magnitude, the dots of a 600 dpi printer are 0.04 mm high. Two of these dots fit on the edge height of 0.1 mm. Thus the edge surface of typical paper sheets is thick and long enough to hold the example robust codes. A 64 bit long code provides enough unique codes to enable each inhabitant of the earth to consume 80,000 sheets of paper (material) per day for over 100 years.

There are many schemes that may be used to create a unique code to mark the edges of sheets of material. In addition to a unique sheet identifier, the edge code may also include information identifying the manufacturer, date of manufacture, a ream identifier, etc. The exemplary coding scheme described below includes a unique sheet identifier and a ream identifier. It should be noted that the ream identifier is optional.

The exemplary coding scheme codes the ream and sheet identifiers on the same edge, thus allowing pre-marking of the two identifiers on all four edges, which may be advantageous for some applications. Referring to FIG. 1, ream 20 includes a plurality of individual sheets of material 10 (typically there are 500 sheets in a ream). In this coding scheme, the ream identifier and sheet identifier are on one edge. A ream identifier 22 is pre-marked at one section of the combined edges. In this embodiment, the ream identifier consists of bars. The sheet identifier is created by offset line 24, drawn across the entire ream. This marking scheme enables pre-marking of the entire ream at the same time. The offset 25 between the offset indicator mark 27 and the reference mark 29 is sufficient to discriminate each sheet of a ream. Note that the reference mark is denoted by a bar 29 formed on all sheets. This facilitates a uniform measurement. Optionally, the ream identifier 22 (or the last bar of the ream identifier if the ream identifier is in the form of a barcode) could be used as the reference mark from which offset distances are measured.

In this example, the value of the unique identifier for sheet M of a ream of N sheets of material may be computed as the distance 23 or as the ratio of the distance 23 over the entire distance 23+25. The offset distance may be proportional to M/N, where the encoded sheet material is number M of N sheets in a ream, where N>1 and M[N. This value in conjunction with the ream portion 22 provides a unique identifier for sheet M. Ream identifier 22 may also include manufacturer name, date of manufacture, type of sheet material, etc.

For a typical 20 pound ream of photocopy paper (height of 5 cm, sheet thickness of 0.1 mm, and 20 cm of the ream edge dedicated to the offset line), the offset of two consecutive sheets is 0.4 mm. In addition, drawing thicker lines parallel to the offset indicator line 24 may assist the edge reader device in evaluating each sheet offset (because of the regularly distributed small plots on the edge of each sheet). Other alternatives exist, such as any asymmetric curvilinear function drawn in place of straight line 24 (provided the curve provides a unique code for each sheet), varying the color of the offset line from ream to ream.

By marking sheets of material at production time with industrial means, invisible inks, fluorescent dyes or other technical inks may be used (in addition to standard visible inks or a combination of visible and invisible inks). While it is anticipated that most sheets of material will be pre-marked, i.e., during manufacture and before an information is recorded on the surface, pre-marking is not required. Edges may be marked with a code after a sheet of material has been printed or recorded with information. Edge marking after information is recorded is useful for existing physical documents, such as reports, articles, magazines, books, etc.

Figure 2:
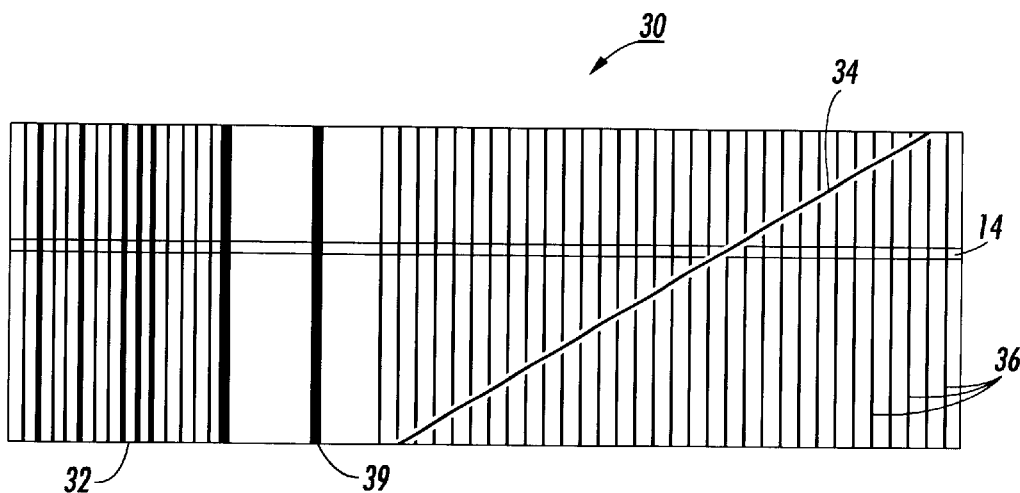
FIG. 2 is a diagram illustrating an enhanced coding scheme using a graphical clock.
Figure 3:
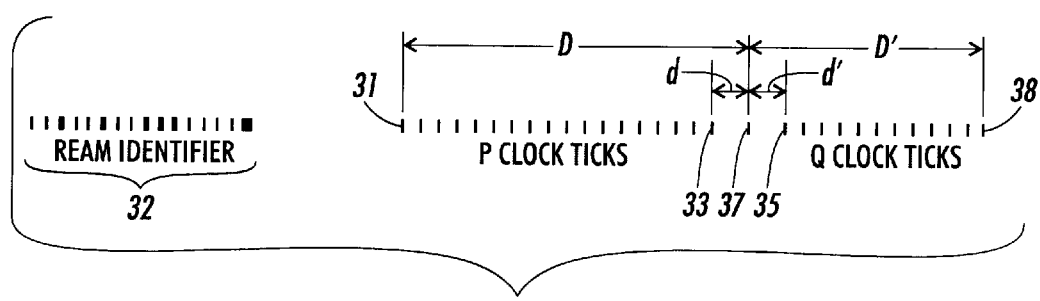
FIG. 3 is an example of code on the edge of one sheet from the stack shown in FIG. 2.

Referring to FIGS. 2 and 3, another embodiment of a coding scheme is shown. FIG. 2 is an edge view of a ream 30 of sheets of material, such as paper, and FIG. 3 is an edge view of sheet H taken from ream 30. The coding scheme includes a ream identifier 32, which is pre-marked at one section of the combined edges. In this embodiment, the ream identifier consists of bars. The sheet identifier is created by offset line 34, drawn across the entire ream. This marking scheme enables pre-marking of the entire ream at the same time. Also included are graphical clock marks 36, which are equally spaced vertical marks disposed along the edge. The graphical clock marks ensure proper reading precision of the offset mark on each sheet. The graphical clock marks may be used to estimate the reading speed of the optical reading device and to determine the location of the offset mark 37 on individual sheet H. A reference bar 39 may be used for measuring an offset distance as described above with reference to FIG. 1. However, in the coding scheme shown in FIGS. 2 and 3, the reference marks will be the first clock mark 31 and the last clock mark 38.

In the coding scheme described with reference to FIG. 1, the unique sheet identifier was the offset mark 27. Not all optical readers may be capable of accurately measuring the offset distance from the reference mark 29 to the offset mark 27 in FIG. 1 or from a reference mark (39, 31 or 38) to the offset mark 37 in FIG. 3. The graphical clock marks spaced around the offset mark 37 can be used to approximate the location of the offset mark 37 or to verify it. The offset reading is achieved by counting the number of clock ticks before (P) and after (Q) the offset mark 37, and by measuring the distance between the offset mark 37 and its closest clock bars 33 and 35, on its left and right.

To identify each sheet in the ream uniquely, the distance between the closest clock mark and the offset mark must be measured. If $d_c$ is the distance between similar edges of two consecutive clock marks, d is the distance between the left clock mark 33 and the offset mark 37, d' is the distance between the right clock mark 35 and the offset mark 37, referring to FIG. 3, the offset distance $D=P \times d_c+d$ and $D'=Q \times d_c+d'$. Note that d and d' need to be measured between similar edges.

There are several ways to make sure that the reader differentiates the offset line from the clock bars, for instance by having different bar width, or different space width. The offset mark may also be a sloped line and the clock marks may be vertical lines. The offset mark may be a different color from the clock marks.

Figure 4:
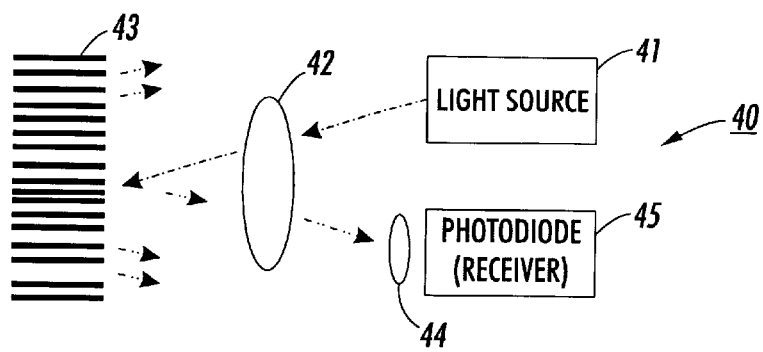
FIG. 4 is diagram illustrating barcode optical sensing.

Our experimentations showed that this kind of code can be read by a manual scan along a horizontal line with a low-end barcode wand such as the ScanTeam 6100 optical wand (see http://www.handheld.com/search.asp?todo=get product detail&product id=3062). These wands 40 are based on standard inexpensive components and work based on the principal shown in FIG. 4. Light from light source 41 is focused by lens 42 onto a bar code 43 to be read. Reflected light from the bar code 43 is focused by lens 42 onto aperture 44 where it is detected by received 45, which is typically a photodiode.

Figure 5:
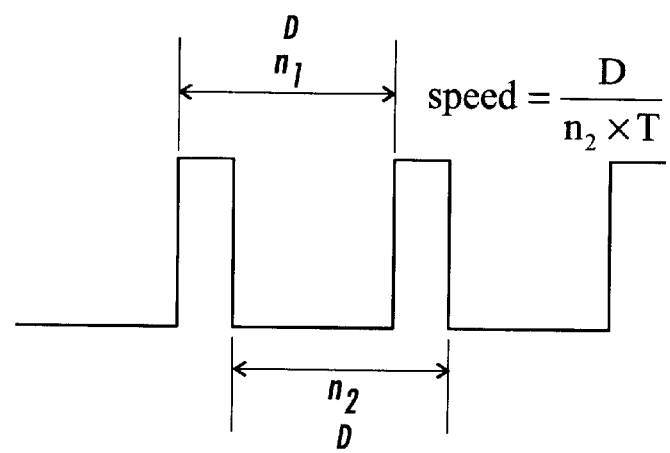
FIG. 5 illustrates speed computation of a graphical clock signal.

Once the signal from the optical wand 40 is acquired by sampling, the main problem in measuring the distance of the mark resides in properly handling the possible scan speed variations, in particular in the case of a manual scan. The graphical clock solves this problem by providing synchronization. Given the width $d_c$ of the clock marks, the sampling frequency T, counting the number of samples between similar edges ($n_1$ is the number of samples between leading edges, $n_2$ is the number of samples between trailing edges) permits computation of the scanning speed on each element of the pattern. Speed=$D/(n_2 \times T)$. This is shown in FIG. 5.

The optical wand does not detect bars and spaces and spaces equally well. Usually bars are perceived larger and spaces smaller than they actually are. The speed calculation shown in FIG. 5 accounts for this distortion.

The speed in the area of the slope mark must be extrapolated, since a quiet zone usually surrounds the slope line in order to avoid crossings that are difficult to detect. Given the small size of this area, the speed extrapolation introduces as little error as the inherent system noise does, in view of our experimentations.

The slope line area (offset mark) can be detected in various, possibly complementary ways. For example, detection of the offset mark can be facilitated by ensuring that any space between a clock bar and the slope line is significantly different than the clock space. Detection of the offset mark can also be facilitated by making the width of the slope line different from the width of the clock marks. If the clock marks and offset mark coincide or are adjacent (very close to each other), then the reader must be able to distinguish one from the other (otherwise, either the offset mark might not be detected or distances d and d' may not be reliably measured). When they are adjacent, if they are of different color and if the reader senses color, the reader can detect them properly. But if they overlap, the case is difficult, and the reader may not be able to detect offset mark at all. Detection of the offset mark can be facilitated by providing a white zone above and below the offset line, as is shown in FIG. 2, so that the offset mark will appear alone.

The coding scheme provides for simple error detection and correction. For example, errors may be detected by counting the number of perceived lines. This number is constant for each sheet in the ream. Missing clock bars or additional spaces can often be tolerated. Instead of having a constant uniform spacing between clock bars, the clock bar spacing can be varied in a predetermined predictable way. For example, the spacing can be different depending on whether the clock bars appear on the left or right side of the slope line 34. The clock bar spacing can increase from one edge corner to the next in a known way (by some multiple, for example).

Figure 6:
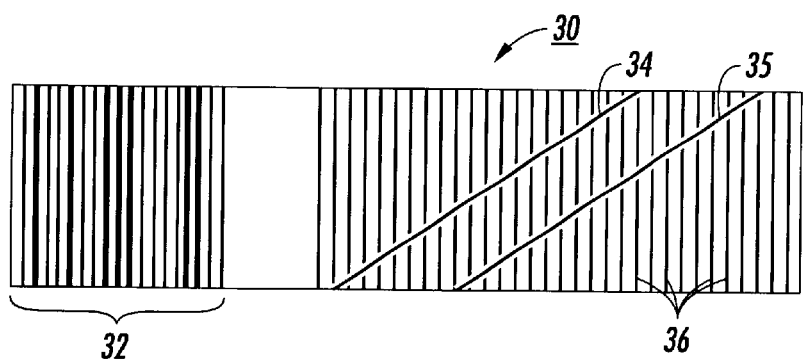
FIG. 6 illustrates an edge pattern with two slope lines for redundancy.
Figure 7:
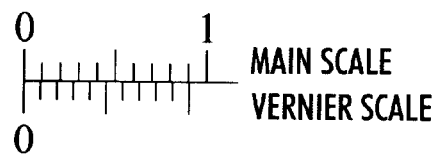
FIG. 7 illustrates a 10 division Vernier scale.

Code redundancy can be achieved by having several redundant slope lines, as shown FIG. 6. FIG. 6 is similar to FIG. 3, but includes two slope lines 34 and 135 which provide for two offset marks to be used in the code.

The various coding parameters used in a particular implementation of the coding scheme, such as clock bar spacing, line width, and so on, can be encoded in an additional barcode marked on the same edge or a different edge. This provides flexibility to users in that the bar code can be read to determine the parameters, which may then be provided to the barcode reader in order to decode the edge coding.

While the foregoing examples show clock bars as vertical and offset bars as sloped lines, it is technically possible to make different angular choices for either or both.

The foregoing edge code has been verified experimentally. We have achieved a reading precision of 2/1000 of an inch, for manual scans.

Another coding scheme is based on a Vernier scale, which improves the reading precision by a factor N while putting minimal requirements on the reading device, so that simple and standard electro-optical components commonly used in the barcode industry (such as the optical wand described above). High reading precision is needed, for example, in applications that involve reading an edge code on a single sheet of material located within a large stack of sheets. This coding scheme uses the graphical clock described above and a plurality of slope lines, also called offset lines, positioned to form a Vernier scale over the graphical clock lines, which forms the main scale.

A Vernier scale is a short movable scale placed next to the main scale of a measuring instrument. It is named after its inventor, Pierre Vernier (1580–1637). A Vernier scale improves the precision of the main scale by a factor of N, where N depends on the characteristics of the small scale. A well-known example of measuring instrument using, this principle is the Vernier caliper. See http://www.newadvent.org/cathen/15359a.htm, http://www.saburchill.com/physics/chapters/0095.html or http://www.fsc.ufsc.br/~ccf/parcerias/ntnujava/ruler/vernier.html for more on Pierre Vernier and the Vernier scale.

Figure 8:
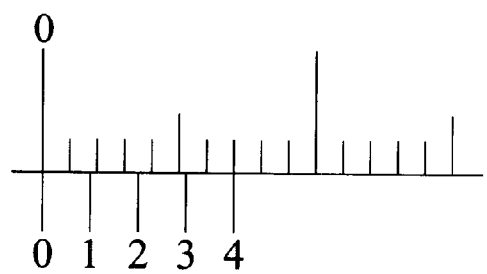
FIGS. 8 and 9 illustrate 4 divisions of a Vernier scale and the measure of a distance on the scale.

FIG. 8 shows an example of a Vernier scale that has 10 divisions. Note that the 10 Vernier scale divisions have the same length as 9 divisions of the main scale, thus improving the measure precision by a factor 10.

Figure 9:
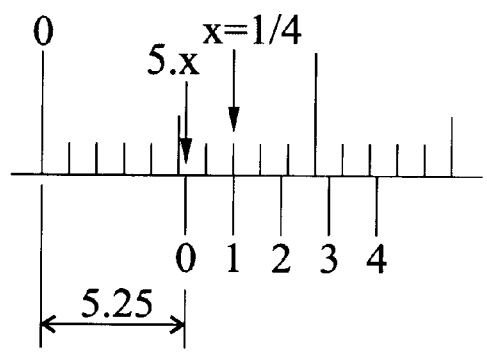

More generally, let N be the number of divisions of the Vernier scale. Its length must be equal to m×N−1 divisions of the main rule to have a precision of 1/N of the main rule unit (m being any non null positive integer). Figure illustrates a Vernier scale with N=4 and m=2. FIG. 9 shows how a distance measurement is made using the Vernier scale of FIG. 8.

Figure 10:
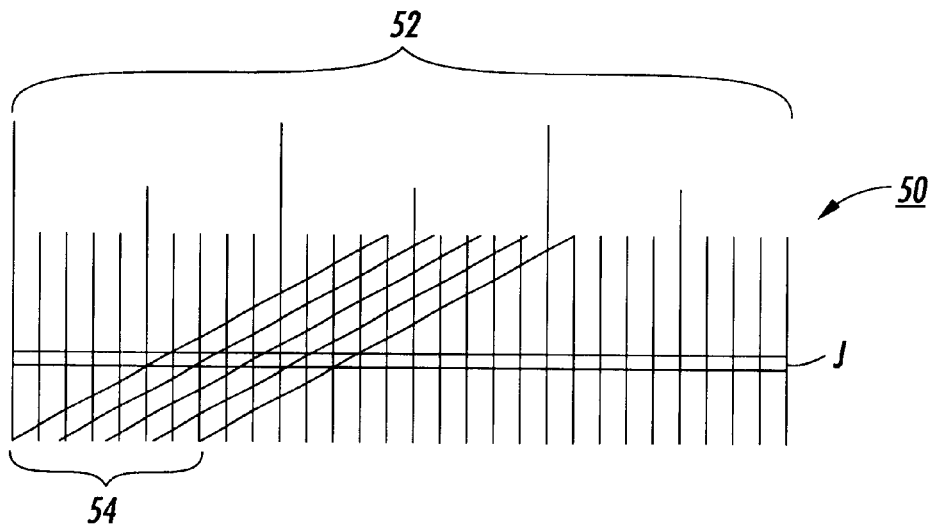
FIG. 10 is a diagram of a scheme for an edge marking including a ream marking and individual sheet marking including 5 slope lines forming 4 Vernier divisions.
Figure 11:
FIG. 11 is an example of code on the edge of one sheet from the stack shown in FIG. 10.

FIG. 10 is an edge view of a ream 50 of sheets of material, such as paper, and FIG. 11 is an edge view of sheet J taken from ream 50. The sheet identifier code is created by the graphical clock, which includes a first plurality of vertical lines 52. The graphical clock is also considered the main rule. A second plurality of sloped lines 54 is arranged to form a Vernier scale of N divisions. In this example, N=4 and m=2. Note that if the second plurality is a positive integer N, the spacing between Vernier marks is d, the spacing between clock marks is e, then d×N=(m×N−1)×e, where m is any positive integer greater than zero.

An edge view of sheet J is shown in FIG. 11. This slice shows that the first slope line 56 crosses the clock after division 5, and that the second slope line coincides with a clock line 58. Thus the distance or offset or unique code for sheet J is read as 5.25.

This coding scheme provides a measuring precision of (B+S)/N, where B is the width of the line, S the width of the spaces. The values of B, S, N are limited by both the marking and reading technologies: the accuracy of the placement of the lines is limited by the printing accuracy, thus limiting N; and the values of B and S are limited mainly by the sensing technology. Experimentations with an electro-optical based sensor we have found that B must be at least of the size of the aperture of the optical wand, while S must be at least of 1.5×S. With a typical 4/1000 inch aperture sensor, we have a minimal B+S of around 10/1000 inch. Then the overall precision can be tuned by choosing appropriately N, taking into account the printing accuracy.

Figure 12:
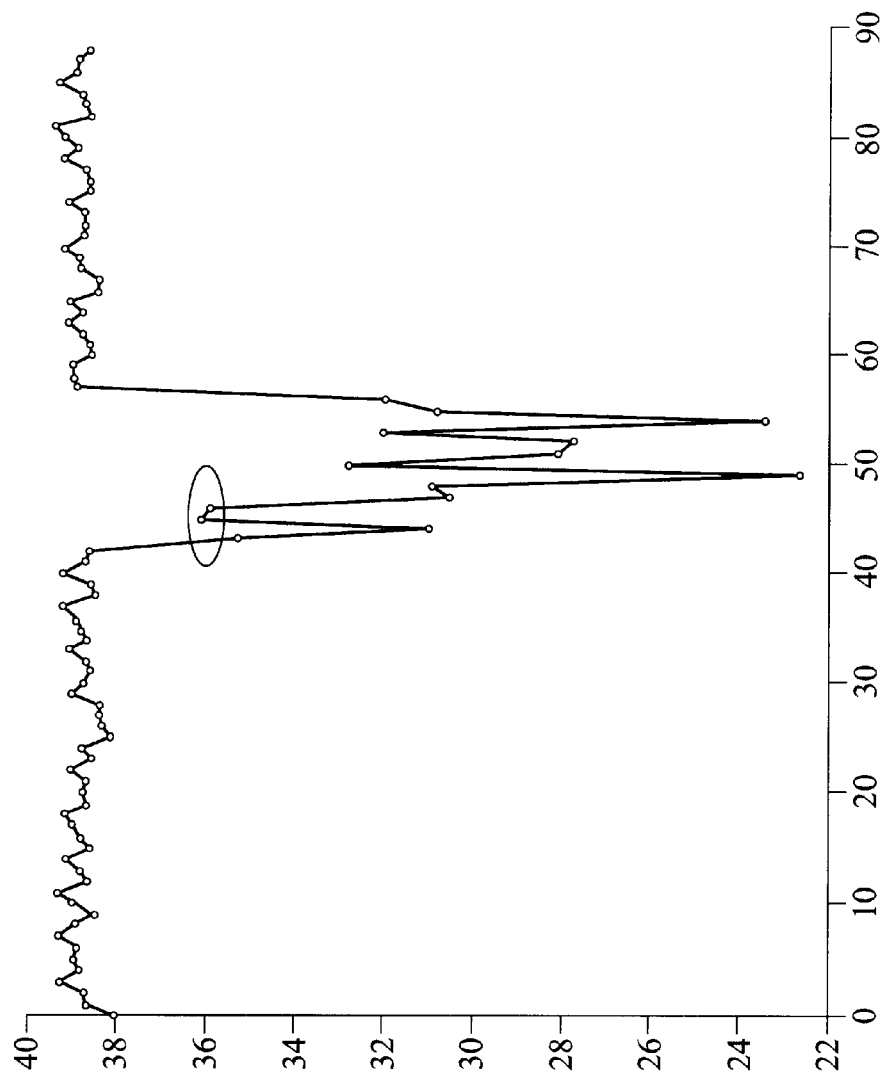
FIG. 12 is a graph of perceived width of space across the scanning line on the pattern of FIG. 10.

Interestingly, it should be noted that the reading or detecting task shifts from measuring a distance between two lines to determining the best coincidence between the clock marks and the Vernier marks. And for this task, we have to take into account the information provided by the non-coinciding lines. It is interesting to study the plots of the perceived spaces when scanning the proposed pattern at various heights. We obtain a family of graphics like the one shown in FIG. 12. We have circled the areas of the best coincidence in FIG. 12.

It is possible that the knowledge of the family of plots resulting from scans will enable the Vernier pattern to be read with a precision better than the optical reader's raw precision, in a similar way to what humans do when reading a Vernier scale. (We find the best coincidence also by looking at bad coincidences and at how they evolve towards the left and the right.)

Robustness of this coding scheme can be affected by the following. Values of m greater than 1 result in the interleaving of the clock pattern with the Vernier pattern, and permit the reading device to estimate the scanning speed in the Vernier area. By contrast, with m=1, the speed can be estimated before and after the Vernier area, but must be extrapolated over it. To provide redundancy, multiple Vernier scales can be overlaid on the clock pattern, in sequence. The figures show vertical clock bars and slope offset lines for convenience only. As with the prior coding scheme, it is technically possible to make different angular choices.

An accrued reading precision allows us to have steeper slope lines and therefore to mark larger stacks of material at the same time. In order to differentiate reliably any two consecutive sheets from a marked stack, their offset measures must be different by more than the reading precision. Their offset difference equals L/H×T, where L is the pattern width, H the stack height, and T the average paper thickness. So we see that the stack height is proportional to the reading precision (inversely proportional to the offset difference). So improving the reading precision by a given factor increases the maximum height of marked stacks by the same factor.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. An encoded sheet material, comprising:
   a sheet of material having a first surface, a second surface disposed opposite the first surface and an edge extending between the first surface and the second surface and peripherally about the sheet of material, the edge having indicia arranged thereon to form a code uniquely identifying the sheet of material;
   wherein the code comprises an offset mark located at an offset distance from a reference mark on the edge and a plurality of equally spaced clock marks disposed along the edge, such that the offset distance can be approximated by a product of a number of clock marks between the reference mark and the offset mark multiplied by the times (distance between successive clock marks).

2. The encoded sheet material of claim 1, wherein the reference mark comprises a mark on the edge.

3. The encoded sheet material of claim 1, wherein the reference mark comprises a corner of the edge.

4. The encoded sheet material of claim 1, wherein the reference mark comprises the first clock mark and the offset distance can be approximated by sum of the distance between the offset mark and the closest clock mark and the product of the number of clock marks between the reference mark and the offset mark times the distance between successive clock marks.

5. The encoded sheet material of claim 4, wherein the ream mark comprises a bar code.

6. The encoded sheet material of claim 1, wherein the code further includes a ream mark identifying the ream and the reference mark comprises a portion of the ream mark.

7. The encoded sheet material of claim 1, wherein the offset distance can be approximated by sum of the distance between the offset mark and the closest clock mark and the product of the number of clock marks between the reference mark and the offset mark times the distance between successive clock marks.

8. The encoded sheet material of claim 1, wherein the offset mark comprises a sloped line and the clock marks comprise vertical lines with respect to the edge.

9. The encoded sheet material of claim 1, wherein the width of the offset mark is greater than the width of the clock marks.

10. The encoded sheet material of claim 1, wherein the width of the offset mark is less than the width of the clock marks.

11. The encoded sheet material of claim 1, wherein the color of the clock marks is different from the offset mark.

12. The encoded sheet material of claim 1, further comprising a second offset mark located at a second offset distance from the reference mark and spaced apart from the first offset mark.

13. The encoded sheet material of claim 1, wherein the clock marks are spaced apart from one another according to a predetermined relationship.

14. The encoded sheet material of claim 1, wherein the code further includes a first portion identifying the predetermined relationship.

15. An encoded sheet material, comprising:
   a sheet of material having a first surface, a second surface disposed opposite the first surface and an edge extending between the first surface and the second surface and peripherally about the sheet of material, the edge having indicia arranged thereon to form a code uniquely identifying the sheet of material;
   wherein the code comprises coincidence between a first plurality of equally spaced apart clock marks disposed along the edge and a second plurality of equally spaced Vernier marks, wherein the second plurality is less than the first plurality.

16. The encoded sheet material of claim 15, wherein the encoded sheet material is one sheet in a ream of sheets of encoded sheet material and wherein the code further includes a first portion identifying the ream.

17. The encoded sheet material of claim 15, wherein the clock marks comprises vertical lines with respect to the edge and wherein the Vernier marks comprise sloped lines with respect to the edge.

18. The encoded sheet material of claim 15, wherein the spacing between the clock marks is less than the spacing between the Vernier marks.

19. The encoded sheet material of claim 15, wherein the second plurality comprises a positive integer N, the spacing between Vernier marks is d, the spacing between clock marks is e, and d×N=(m×N−1)×e, where m is any positive integer greater than zero.

20. A method of decoding an encoded sheet material, wherein the encoded sheet material includes a sheet of material having a first surface, a second surface disposed opposite the first surface and an edge extending between the first surface and the second surface and peripherally about the sheet of material, the edge having indicia arranged thereon to form a code uniquely identifying the sheet of material, comprising:
   scanning the edge code;
   detecting any offset marks on the edge;
   detecting any clock marks on the edge;
   counting the clock marks between a reference mark on the edge and the offset mark;
   measuring a distance between the offset mark and an adjacent clock mark; and computing a sum of the distance between the offset mark and the adjacent clock mark and a product of a number of clock marks between the reference mark and the offset mark multiplied by the times (distance between clock marks).

21. The method of claim 20, further comprising:

counting the clock marks between a second reference mark on the edge and the offset mark;

measuring the distance between the offset mark and an adjacent clock mark; and computing the sum of the distance between the offset mark and the adjacent clock mark and the product of the number of clock marks between the second reference mark and the offset mark times the distance between clock marks.

22. The method of claim 20, further comprising:

detecting a ream bar code on the edge;

wherein the sheet code comprises a combination of the offset distance and the ream bar code.

23. A method of decoding an encoded sheet material, wherein the encoded sheet material includes a sheet of material having a first surface, a second surface disposed opposite the first surface and an edge extending between the first surface and the second surface and peripherally about the sheet of material, the edge having indicia arranged thereon to form a code uniquely identifying the sheet of material, comprising:

scanning the edge code;

detecting any clock marks on the edge;

detecting any Vernier marks on the edge;

detecting coincidence between the detected clock marks and the detected Vernier marks; and determining an offset distance using the coincidence between the detected clock marks and the detected Vernier marks.

* * * * *